United States Patent [19]

Yasoshima

[11] 3,892,146

[45] July 1, 1975

[54] ELECTRIC CONTROL FOR AN ELECTRIC MOTOR OPERATED NUT FASTENING TOOL

[75] Inventor: Hiroshi Yasoshima, Chigasaki, Japan

[73] Assignee: Shibaura Engineering Works, Ltd., Tokyo, Japan

[22] Filed: Aug. 28, 1974

[21] Appl. No.: 501,341

[30] Foreign Application Priority Data
Aug. 31, 1973  Japan.............................. 48-97874
Nov. 28, 1973  Japan............................ 48-133764

[52] U.S. Cl.............................. 81/52.4 R; 173/12
[51] Int. Cl. ................................................... B25b
[58] Field of Search......... 81/52.4 R, 52.5; 318/293; 173/12

[56] References Cited
UNITED STATES PATENTS

| | | | |
|---|---|---|---|
| 1,970,179 | 8/1934 | Miller............... | 81/52.4 R |
| 3,421,562 | 1/1969 | Orloff et al. .......... | 29/517 |
| 3,494,430 | 2/1970 | Lehmann et al...... | 173/12 |
| 3,584,694 | 6/1971 | Wallace ................ | 173/12 |

*Primary Examiner*—James L. Jones, Jr.
*Attorney, Agent, or Firm*—Oblon, Fisher, Spivak, McClelland & Maier

[57] ABSTRACT

An electric motor operated nut fastening tool is disclosed which is adapted for use with a removably mounted nut setting adaptor. An electric control circuit is provided for running the motor forward to tighten the nut. The nut is driven until the motor armature current increases to a predetermined amplitude, thereby causing the control circuit to reverse the motor and release the nut from the adaptor.

7 Claims, 4 Drawing Figures

3,892,146

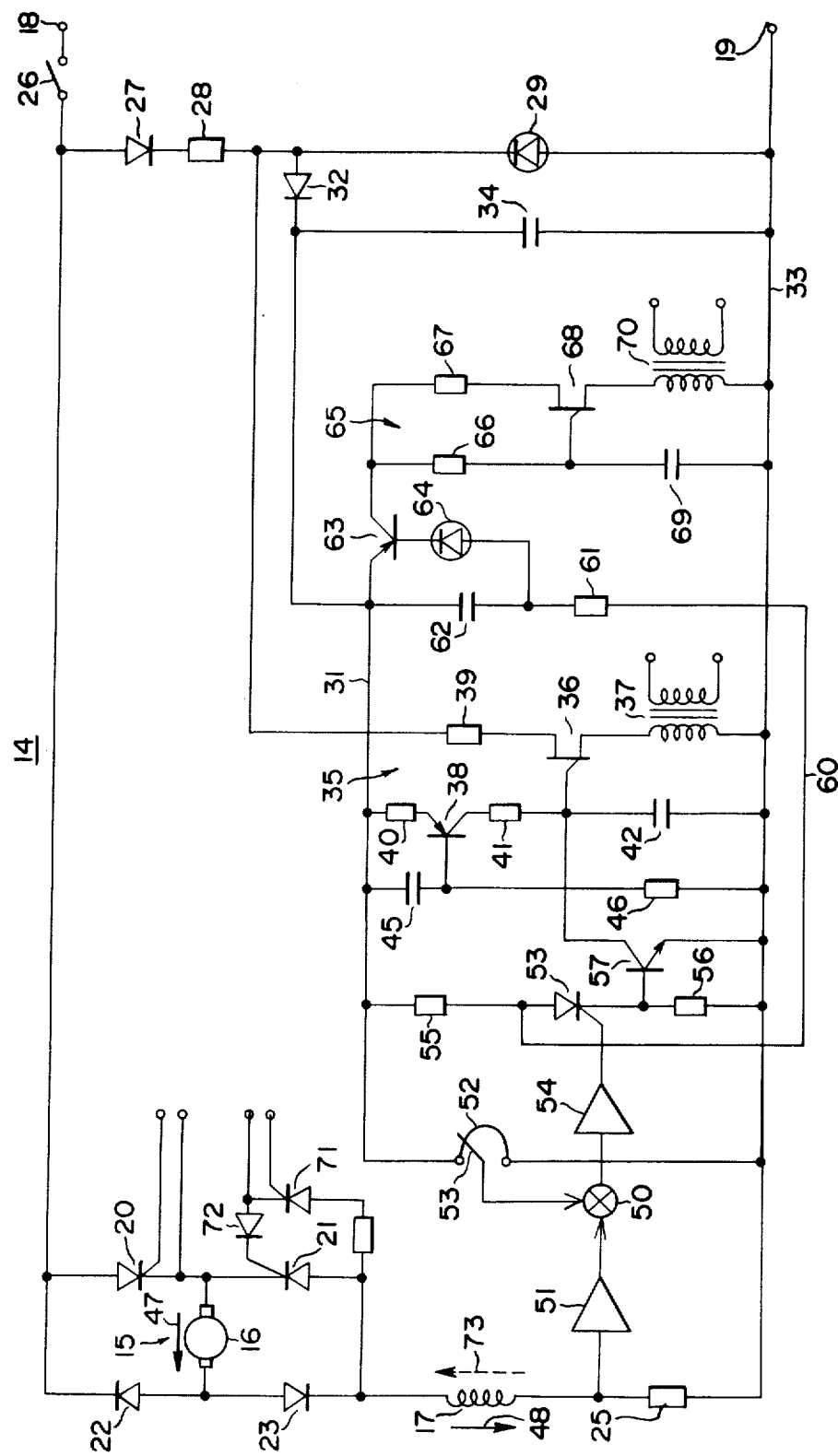

3,892,146

1

ELECTRIC CONTROL FOR AN ELECTRIC MOTOR OPERATED NUT FASTENING TOOL

BACKGROUND OF THE INVENTION

1. Field of the Invention

This invention relates generally to an electric control for an electric motor operated nut fastening tool, and more particularly to an electric control for a nut fastening tool adapted to be used with a nut setting adaptor.

2. Description of the Prior Art

There are various types of nut fastening tools employed in the fields of building construction, large machine fabrications and the like. The nuts used in those fields are generally of a large size such that a hydraulic nut fastening tool could be conveniently employed to screw-up or tighten the nut.

Alternately, in assembling the parts of prefabricated houses or machines of relatively small size, relatively small nuts are usually used and are tightened by pneumatic tools.

Pneumatic tools have been somewhat satisfactory, but require an air compressor and an elongated air hose for connection with the pneumatic nut fastening tool. Accordingly, these systems as a whole are both complicated an expensive, as well as being hard to handle.

SUMMARY OF THE INVENTION

It is therefore an object of the invention to provide an electric motor operated nut fastening tool which eliminates the defects described above.

Another object of the invention is to provide an electric motor operated nut fastening tool which is portable and easy to handle.

A further object of the invention is to provide an electric motor operated nut fastening tool which is convenient to use with a nut setting adaptor for clamping the nut to be fastened.

A still further object of the invention is to provide an electric control for an electric motor operated fastening tool which enables the motor to rotate forward to drive the nut in the fastening direction and to cause the nut setting adaptor to clamp the nut to be fastened tightly, and which also enables the motor to rotate in reverse automatically to release the nut from the nut setting adaptor after finishing a fastening operation.

Briefly, in accordance with one embodiment of the invention, these and other objects of the invention are achieved by providing an electric motor operated nut fastening tool to be used with a nut setting adaptor which has a plurality of pawls for clamping a nut to be fastened. The motor operated nut fastening tool is provided with an electric control for driving the motor forward to tighten the nut and for driving the motor in reverse to automatically release the clamping of the nut by the nut setting adaptor in response to a predetermined level of the armature current of the motor at the termination of the fastening operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a schematic circuit diagram of the electric control circuit shown in FIG. 1;

DESCRIPTION OF THE PREFERRED EMBODIMENTS

Figure 1:
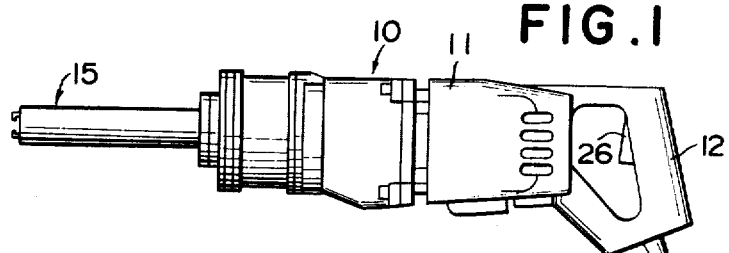
FIG. 1 is a side elevation of one embodiment of an electric motor operated nut fastening tool in accordance with this invention with a nut setting adaptor removably mounted thereon and with an electric control circuit provided in the energization cable therefor.

Referring now to the drawings, wherein like reference numerals designate identical or corresponding parts throughout the several views, and more particularly to FIG. 1 thereof, there is generally shown an electric motor operated nut fastening tool 10 according to this invention, and the same comprises a tool body 11, a grip member 12 and an electric cable 13 through which electric energy is supplied to the nut fastening tool 10 from an electric A.C. voltage supply (not shown). The tool 10 also includes an electric motor enclosed in body member 11. The motor is shown in FIG. 2 and its function is described hereinbelow referring to FIG. 2. An electric control 14 is also provided in cable 13 for effecting motor control. It can be clearly understood that the illustrated arrangement of the control 14 is merely one example for convenience of understanding and the same can be positioned within the tool body 11.

A nut setting adaptor or attachment is generally shown with a reference numeral 15 and the same is removably mounted at the front end of the tool body 11. The nut setting adaptor 15 may be of the type shown in Japanese Patent Public Disclosure No. 18074 of 1974 and U.S. Pat. No. 3,421,562 entitled "Tension Stressed Structure", granted to Orloff et al. and assigned to Huck Manufacturing Company, Detroit, Michigan, U.S.A. These adaptors respectively have a plurality of pawls or finger members which are adapted to clamp the nut to be fastened at termination of the fastening operation of the nut.

FIG. 2 shows in detail the control circuit 14 which is suited for controlling an electric motor 15 having an armature 16 and a series field winding 17. The motor 15 of this type is generally called a "Universal Motor" and can be operated in both A.C. and D.C. circuits. In FIG. 2, the motor 15 is, however, shown as energized from a D.C. voltage supply obtained by rectifying a single phase A.C. voltage from terminals 18 and 19 into a D.C. voltage by means of thyristors 20 and 21 and diodes 22 and 23.

The pair of thyristors 20 and 21 is connected in series in reverse polarity as shown, and similarly the pair of diodes 22 and 23 is also connected in series and in reverse polarity. The series combination of thyristors 20 and 21 is further connected in parallel with the other series combination of diodes 22 and 23. Then the motor armature 16 is connected between the interconnected point of thyristors 20 and 21 and the interconnected point of diodes 22 and 23.

The motor armature circuit described above is connected in series with the series field winding 17. In order to detect an electric quantity responsive to the motor armature current, a resistor 25 is further provided in series with the series combination of armature circuit and field winding 17, so that the resultant combination is energized from the A.C. input terminals 18 and 19 through a manual switch 26 which is mounted on grip 12 of tool body 11 of FIG. 1.

For establishing a D.C. control voltage supply, a series combination of a diode 27, a voltage dropping resistor 28 and a Zener diode 29 are connected between A.C. terminals 18 and 19 through manual switch 26, in which diodes 27 and 29 have their conduction polarities as shown. An interconnected point between resistor 28 and Zener diode 29 is connected to one D.C. control bus line 31 through a backward-current inhibiting diode 32. A line conductor 33 is used as the other D.C. control bus line. The D.C. control voltage is smoothed by a filter capacitor 34 connected between a cathode electrode of diode 32 and line conductor 33.

It is now assumed that switch 26 is closed to energize the control circuit 14 for the motor 15 from A.C. input terminals 18 and 19. A gating circuit for thyristor 20 is generally designated by a reference numeral 35 and the same comprises UJT (unijunction transistor) oscillator 35 having a UJT 36, a pulse transformer 37, a transistor 38, resistors 39, 40, 41 and a capacitor 42. UJT 36, the pulse transformer 37 and the resistor 39 are connected in series as shown, and the series combination of them is connected between the cathode of diode 32 and the line conductor 33, so that it is possible to output the gating signals which are synchronized with the A.C. frequency at the terminals 18 and 19 from gating transformer 37 to the gate electrode of thyristor 20.

It is understood that the voltage applied to UJT 36 has a rectangular wave form as the half wave rectified voltage obtained from diode 27 shaped by Zener diode 29.

Meanwhile, a series combination of a capacitor 45 and a resistor 46 is connected between D.C. lines 31 and 33 as shown, and an interconnected point is in turn connected to a base electrode of transistor 38. When the switch 26 has been closed, as described above, to present a D.C. voltage on lines 31 and 33, most of the voltage will be applied to resistor 46 to allow the smallest emitter-base current to flow through the emitter and base electrodes of the transistor 38. Thus the transistor 38 presents the highest resistance between its emitter collector, so that UJT 36 is switched on at the largest angle of electrical lag. As a result, gating pulses to be applied to the gate electrode of the thyristor 20 allow the smallest current to flow therethrough.

The current flowing through thyristor 20 flows through armature 16, diode 23, series field winding 17 and resistor 25, namely the same flows through armature 16 and field winding 17 in a direction as shown with the solid line arrows 47 and 48. This causes the motor 15 to start forward, and a starting current having a small amplitude will flow through the motor 15 instead of the high speed running current with a high amplitude.

As the starting operation of the motor thus proceeds, the capacitor 45 is charged up in accordance with the time constant of the capacitor and the resistor 46, so that the voltage drop across the resistor 46 will decrease gradually. Accordingly the internal resistance of the transistor 38 will in turn decrease thereby to decrease the time constant in the series combination including the resistors 40 and 41, the transistor 38 and the capacitor 42 of the UJT oscillator 35. In this way, the phase of gating pulses emanating from transformer 37 will advance, gradually decreasing the gating lag angle of the thyristor 20. Thus, the starting current flowing through thyristor 20 increases gradually to increase the motor speed more and more.

During the above described operation, the nut setting adaptor 15, which is described in the above disclosed Patent Specifications, receives a nut in the fingers thereof and forces the nut to be screwed onto a bolt at a high speed. The fingers of the nut setting adaptor tightly clamp the nut at the termination of the screwing operation, so that the motor current will come to increase in accordance with the increase in the motor torque. The nut will thus be fastened onto the bolt tightly.

At that time, the motor armature 16 may be locked so as not to further rotate. In this way, the motor current will increase to a peak. The motor current, which will reach a predetermined peak amplitude, is detected by the voltage drop that occurs across resistor 25, and the same is conducted to a comparator 50 through an amplifier 51. A current reference is provided by a potentiometer 52 connected between D.C. lines 31 and 33 and having a slider 53 for obtaining the aforesaid reference introduced to the comparator 50. The comparator 50 outputs an electric signal when the amplitude of the current signal from resistor 25 becomes substantially equal to that of the current reference.

The output signal from comparator 50 is connected to a gate electrode of a first auxiliary thyristor 53 through an amplifier 54. The thyristor 53 is also connected between lines 31 and 33 through resistors 55 and 56 as shown, and the same is fired when it receives the output signal from amplifier 54. The voltage drop occuring across resistor 56 is connected to a base electrode of a transistor 57, the collector electrode of which is connected to the emitter of UJT 36 and the emitter electrode of which is in turn connected to line 33. Accordingly the transistor 57 turns on such that the emitter potential of UJT 36 becomes equal to that of line 33.

In this way UJT oscillator 35 stops its oscillation so that the gate of thyristor 20 is turned off to deenergize the motor 15. Accordingly the motor 15 will stop when the nut has been fastened tightly.

As is illustrated, the anode of thyristor 53 is connected through a conductor 60, a resistor 61 and a capacitor 62 to the line 31. A transistor 63 is provided, with its emitter electrode connected to the line 31 and its base electrode connected to an interconnection point of the resistor 61 and the capacitor 62 through a Zener diode 64 with a conduction polarity as shown. The collector electrode of the transistor 63 is connected to a UJT oscillator circuit 65 to energize the latter. The circuit 65 includes resistors 66 and 67, a UJT 68, a capacitor 69 and a pulse transformer 70 respectively connected as shown. As is clearly shown, the UJT oscillation circuit 65 is connected between the collector electrode of the transistor 63 and the line 33.

During the non-conduction period of the thyristor 53, the anode voltage of thyristor 53 is equal to the voltage of line 31, so that the transistor 63 remains off. When the thyristor 53 becomes conductive as described above, however, the anode potential of Zener diode 64 becomes substantially equal to that of line 33. Accordingly, the voltage of line 31 overcomes the Zener voltage of the diode 64 to enable the transistor 63 to become conductive.

In this way, the UJT relaxation oscillating circuit 65 oscillates to provide gating pulses from pulse transformer 70 to a gate electrode of a second auxiliary thyristor 71. Thus the thyristor 71 becomes conductive whenever the terminal 19 becomes positive relative to the terminal 18. Accordingly thyristor 21 turns on upon having gating signals applied from thyristor 71 through a diode 72 to the gate electrode thereof.

Thus an electric current again flows through the motor armature 16, the thyristor 21 and the series field winding 17 of the motor 15. It can be seen that the field current takes the reverse direction as shown with the dotted line arrow 73 thereby to cause the motor armature 16 to rotate in reverse. This causes the fingers of the nut setting adaptor to release the nut. In this way, an operator can see the fingers of the nut setting adaptor which have released the nut, and then, he can open the switch 26 to deenergize the control circuit 14 and to reset all of the parts in the latter.

From the above, in accordance with this embodiment, the motor runs with a high speed in one direction until the nut has been screwed onto a bolt, then the motor increases its torque to cause the nut setting adaptor to clamp the nut and to further tighten it up, after that, the motor stops automatically at a predetermined amplitude of torque, and lastly the motor starts again in reverse automatically to release the nut from the nut setting adaptor. Accordingly, the electric motor operated nut fastening tool can easily be handled by an unskilled operator. It can be understood that the tightening force on the nut can easily be adjusted by the selection of slider positions of the potentiometer 52. In accordance with the tool disclosed above, it is not required to prepare an air compressor and an elongated air hose which cause the device to be expensive and to be of large size.

Figure 3:
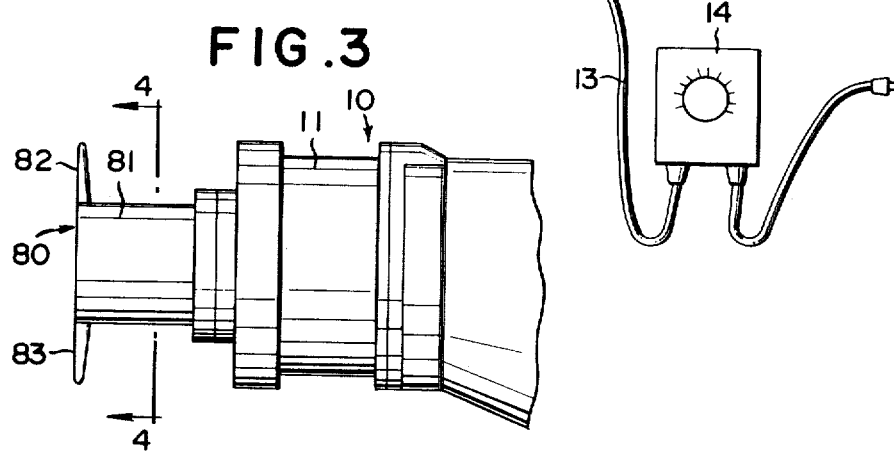
FIG. 3 is a side elevation, partly broken away, of an electric motor operated nut fastening tool with another type of nut setting adaptor mounted thereto; and, FIG. 4 is an enlarged plan view, partly broken away and in section, taken along the line 4—4 of FIG. 3.

FIG. 3 shows a nut setting adaptor 80 removably mounted at the front end of the body 11 of the electric motor operated nut fastening tool 10, and the same is of a type different from that disclosed in the above mentioned two patent specifications as described below.

Figure 4:
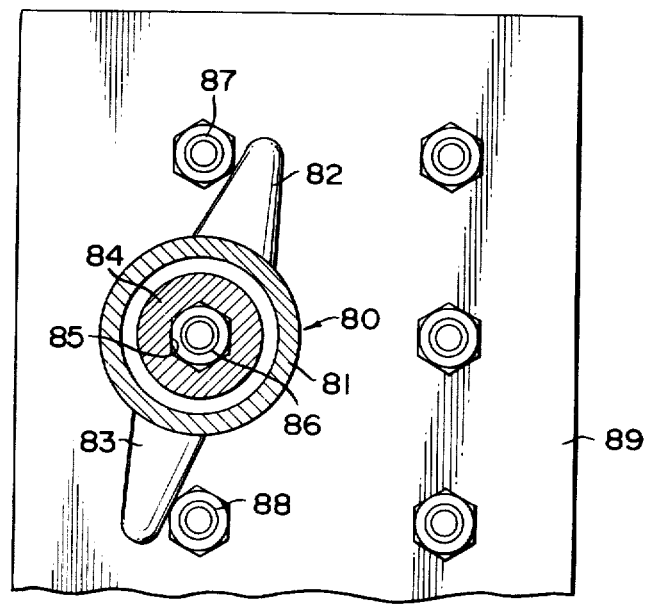

Referring to FIGS. 3 and 4, the adaptor 80 includes a cylindrical member or tube 81 to be removably fixed at the front end of the tool body 11 and a pair of arms or wings 82 and 83 radially and oppositely extending from edge portions of a cylindrical surface of tubular member 81.

The adaptor 80 also includes a nut socket 84 capable of rotation with a motor shaft (not shown) and having a recess 85 adapted to receive a nut to be fastened.

The pair of wing members 82 and 83 is positioned on a surface of a structure 89 upon the fastening operation of the nut 86 such that the members 82 and 83 are located near bolt-nut assemblies 87 and 88, respectively.

In this way, when the nut 86 has been fastened by the clockwise rotation of nut socket 84, a reaction force occurs in tubular member 81 or tool body 11, so that the wings 82 and 83 rotate with tubular member 81 or tool body 11 in reverse to tightly engage the adjacent bolt-nut assemblies 87 and 88. Accordingly, it is not necessary to tightly hold the tool body 11 to overcome the reaction force. After that, the motor rotates in reverse automatically for conveniently taking the wings 82 and 83 out of tight engagement with adjacent assemblies 87 and 88 because the nut 86 has already been fastened.

While the preferred embodiments of the invention have been shown and described, it will be understood that various changes and modifications may be made without departing from the spirit of the invention. For example, it is possible to use a motor energization circuit with full-wave rectification, however in this case it is necessary to provide a fly-wheel diode connected in parallel with the motor armature to permit an electric current to flow therethrough due to self-induction from the armature circuit when the line switch has been switched off.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A nut fastening tool adapted for use with a nut setting adaptor, comprising:
   a body portion enclosing said nut fastening tool, said body portion adapted to have said nut setting adaptor removably mounted thereon,
   a reversible electric motor for driving said nut setting adaptor mounted in said body portion,
   a manual switch for energizing said motor; and,
   an electric control circuit coupled to said motor for controlling the operation thereof, said control circuit including a forward driving circuit and a reverse driving circuit, at least a pair of thyristors, one of which is used for switching said forward driving circuit on and off, and the other of which is used for switching said reverse driving circuit on and off, said control circuit further including means responsive to a predetermined forward driving current flowing through said motor for controlling said thyristors to switch said forward driving circuit off and said reverse driving circuit on;
   whereby a nut is tightened by said fastening tool and then automatically released from nut setting adaptor when completely tightened.

2. A device according to claim 1, wherein said electric control circuit further includes:
   a UJT oscillator circuit adapted to operate in synchronism with the frequency of an A.C. voltage supply, and said UJT oscillator circuit coupled to one of said thyristors for applying gating signals thereto, said ocsillator terminating its output in response to a predetermined peak value of the forward driving current of said motor.

3. A device according to claim 2, in which said control circuit further includes:
   an auxiliary thyristor which turns on in response to a predetermined voltage of said forward driving current of said motor and keeps said UJT oscillator off until said manual switch is opened.

4. A device according to claim 3, in which said control circuit further includes:
   means for detecting the forward driving current level of said motor,
   means for generating a reference current; and,
   means for comparing the detected forward driving current with said reference current to turn on said suxiliary axuiliary when said forward driving current becomes substantially equal to said reference current.

5. A device according to claim 3, in which said control circuit further includes:
 a second UJT relaxation oscillator which starts its oscillation in response to the turning on of said auxiliary thyristor thereby to effect reverse rotation of said motor.

6. A device according to claim 1, wherein said nut setting adaptor includes:
 a nut socket for receiving a nut therein for fastening,
 a tubular member removably mountable on one end of said tool body and fixable thereto so as to surround said nut socket,
 said tubular member being provided with a pair of wing members radially extending from opposite edge portions of said tubular member, said wing members being adapted to take a position engaged with adjacent bolt-nut assemblies during the tightening of a nut located between said bolt-nut assemblies, whereby said nut setting adaptor bears against a reaction force occuring upon the tightening of said nut to be fastened.

7. A device according to claim 4, wherein said current reference generating means includes:
 a potentiometer coupled to a constant D.C. voltage supply, whereby a variable current reference is obtained from said potentiometer for adjusting the gating of one of said pair of thyristors to turn one of said thyristors off at a desired level of motor torque.

* * * * *